(12) United States Patent
Mayer

(10) Patent No.: US 6,398,296 B1
(45) Date of Patent: Jun. 4, 2002

(54) MOTOR VEHICLE ROOF WITH AT LEAST ONE MOTOR-DRIVEN OPENABLE PART AND ASSOCIATED LOCKING ARRANGEMENT ACTUATED BY THE DRIVE MOTOR

(75) Inventor: Johann Mayer, Petershausen (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/594,026

(22) Filed: Jun. 15, 2000

(30) Foreign Application Priority Data

Jun. 15, 1999 (DE) .......................... 199 27 237

(51) Int. Cl.[7] .................................. B60J 7/06
(52) U.S. Cl. ................... 296/219; 296/223; 296/107.16
(58) Field of Search .................. 296/219, 223, 296/107.15, 107.16

(56) References Cited

U.S. PATENT DOCUMENTS

| | | | |
|---|---|---|---|
| 5,018,784 A | * 5/1991 | Yokouchi et al. | 296/219 |
| 5,052,747 A | * 10/1991 | Kubota et al. | 296/219 |
| 5,242,210 A | * 9/1993 | Fujisawa et al. | 296/219 |
| 5,558,388 A | 9/1996 | Fürst et al. | 296/108 X |

* cited by examiner

*Primary Examiner*—Dennis H. Pedder
(74) *Attorney, Agent, or Firm*—Nixon Peabody LLP; David S. Safran

(57) ABSTRACT

A motor vehicle roof with a least one openable roof part (30) which can be actuated by a drive motor (22) and at least one temporarily stationary roof part (12) which supports the openable roof part (30) in its open position. A motor vehicle roof which makes do without a complex actuation mechanism, which can be easily operated and which can be universally used is formed by a drive motor (222) actuating the locking and/or unlocking of the temporarily stationary roof part (12) with reference to an at least temporarily fixed additional roof part, for example, with reference to the rear side columns (B-columns 20) of the motor vehicle. Preferably, the side members (28), which extend between the rear roof part (12) and a front cross beam (2) which runs above the windshield on either side of the openable roof part (3) and which comprise guides (26) for the openable roof part (30), are detachably joined to the motor vehicle (10).

14 Claims, 13 Drawing Sheets

MOTOR VEHICLE ROOF WITH AT LEAST ONE MOTOR-DRIVEN OPENABLE PART AND ASSOCIATED LOCKING ARRANGEMENT ACTUATED BY THE DRIVE MOTOR

BACKGROUND OF THE INVENTION

1. Field of the Invention

The invention relates to a motor vehicle roof with a least one openable roof part which can be actuated by a drive motor and at least one temporarily stationary roof part which supports the openable roof part in its open position.

2. Description of Related Art

In one such motor vehicle roof known from DE 42 03 229 C2 and counterpart U.S. Pat. No. 5,558,388, an openable roof part in the nature of a sunroof panel can be moved while driving in guides of side members in the lengthwise direction of the motor vehicle into any of various open positions, and the side members are pivotably coupled to the rear roof part as a temporarily stationary roof part that is detachably connected to a front cross beam which runs above the windshield and can be pivoted onto the rear roof part after unlocking from the front cross beam. The entire motor vehicle roof including a rear window which is connected to the rear roof part can be lowered, to create a convertible-like roof opening, into a stowage space in the rear part of the motor vehicle by means of a complex mechanism which comprises several drives. In the front cross beam, there is an electric drive which effects unlocking of the side members from the cross beam, a second electric drive in the rear roof part undertakes displacement of the openable roof part and another electric drive which is likewise attached in the area of the rear roof part is used to pivot the side members. Furthermore, there is a hydraulic cylinder in the area of the rear motor vehicle side walls which provides for pivoting of the rear roof part together with the openable roof part which is held by the rear roof part, side members which are swung onto the rear roof part and rear columns (c-columns) on which the rear roof part rests on both sides.

SUMMARY OF THE INVENTION

A primary object of the present invention is to devise a motor vehicle roof of the initially mentioned type which makes do without a complex actuation mechanism, which can be easily operated, and universally used.

This object is achieved in a motor vehicle roof with a least one openable roof part (e.g., a folding roof) which can be actuated by a drive motor and having at least one temporarily stationary roof part (e.g., a roof cassette) which supports the openable roof part in its open position, by the drive motor actuating the locking and/or unlocking of the temporarily stationary roof part with reference to an at least temporarily fixed roof part (e.g., B-columns).

By using the drive motor which is necessary anyway for the opening and closing motion of the openable roof part also for locking and/or unlocking of the one temporarily stationary roof part with reference to another at least temporarily fixed roof part, the complexity of the motor vehicle roof is reduced while maintaining its functionality.

The temporarily stationary roof part is preferably a rear roof part and the at least temporarily fixed roof part is especially side rear columns (B or C columns) of the motor vehicle.

To increase the operating reliability of the motor vehicle roof the openable roof part can be locked in the open position in the temporarily stationary roof part, locking of the openable roof part being actuated in the temporarily stationary roof part preferably by the drive motor.

The construction cost of the motor vehicle roof can be kept low if the drive motor is fixed on the temporarily stationary roof part.

In another embodiment of the invention, the rear roof part, as a temporarily stationary roof part, can be lowered after its unlocking from the at least temporarily fixed roof part, especially after unlocking from the rear columns (B or C columns). In doing so, the rear roof part can be lowered by means of a four-bar arrangement, preferably to such an extent that the top of the rear roof part comes to rest roughly at the height of the equator of the motor vehicle.

Alternatively to, or in combination with, the possibility of lowering the temporarily stationary roof part, it can also be provided that the temporarily stationary roof part after its unlocking from the at least temporarily fixed roof part is completely removed from the motor vehicle.

If also the rear columns of the motor vehicle are made lowerable, a convertible-like roof opening can be created without body parts which project upward above the vehicle equator in the rear area of the motor vehicle. To increase reliability, there can be automatic extension of the rear columns as soon as the electronic monitoring means records a threatening roll-over.

The drive motor which is used to actuate the opening and closing motion of the openable roof part and for actuating the locking and/or unlocking of the temporarily stationary roof part with reference to the at least temporarily fixed roof part can also be used to actuate the locking of the rear roof part in the lowered position and/or to release it from the lowered position. In particular, the drive motor actuates a closing device which is preferably fixed on the temporarily stationary roof part, and is used also not only for locking/unlocking of the temporarily stationary roof part with reference to the at least temporarily fixed roof part, but also with reference, for example, to the four-bar arrangement which controls the lowering motion of the temporarily stationary roof part. For this purpose there can be a thrust bearing which interacts with the closing device on the at least temporarily fixed roof part and on the four-bar arrangement.

The back part of the motor vehicle which comprises a rear window can be fixed on the rear roof part. If the rear roof part is made lowerable, the rear window is preferably made of a foldable plastic material.

If the bottom of the rear part of the motor vehicle which is fixed on the rear roof part can be placed against a rear door of the motor vehicle and can be folded upward, especially the accessibility to a stowage space placed in the area of the motor vehicle rear can be improved.

Side members which comprise guides in which the openable roof part is at least in part movably held between its open position and its closed position can extend between the rear roof part and the front cross beam which runs above the windshield on either side of the openable roof part, there. These side members, preferably, are detachably connected to the front cross beams and the side rear columns of the motor vehicle. Here, it is advantageous if the rear roof part is locked on the at least temporarily fixed roof part to move the guides of the side members into alignment with guides which are fixed in the open position for movable accommodation and support of the openable roof part in the rear roof part.

The openable roof part can be a roof part which can be opened while driving, such as a folding roof or a louvered roof of a fundamentally known type. It goes without saying that the within the framework of this invention as the openable roof part also a sliding roof or a sliding and lifting roof with one or more covers, preferably with two covers, can be used.

In the following, advantageous embodiments of the subject matter of the invention are explained with reference to the accompanying drawings.

DETAILED DESCRIPTION OF THE INVENTION

Figure 1:
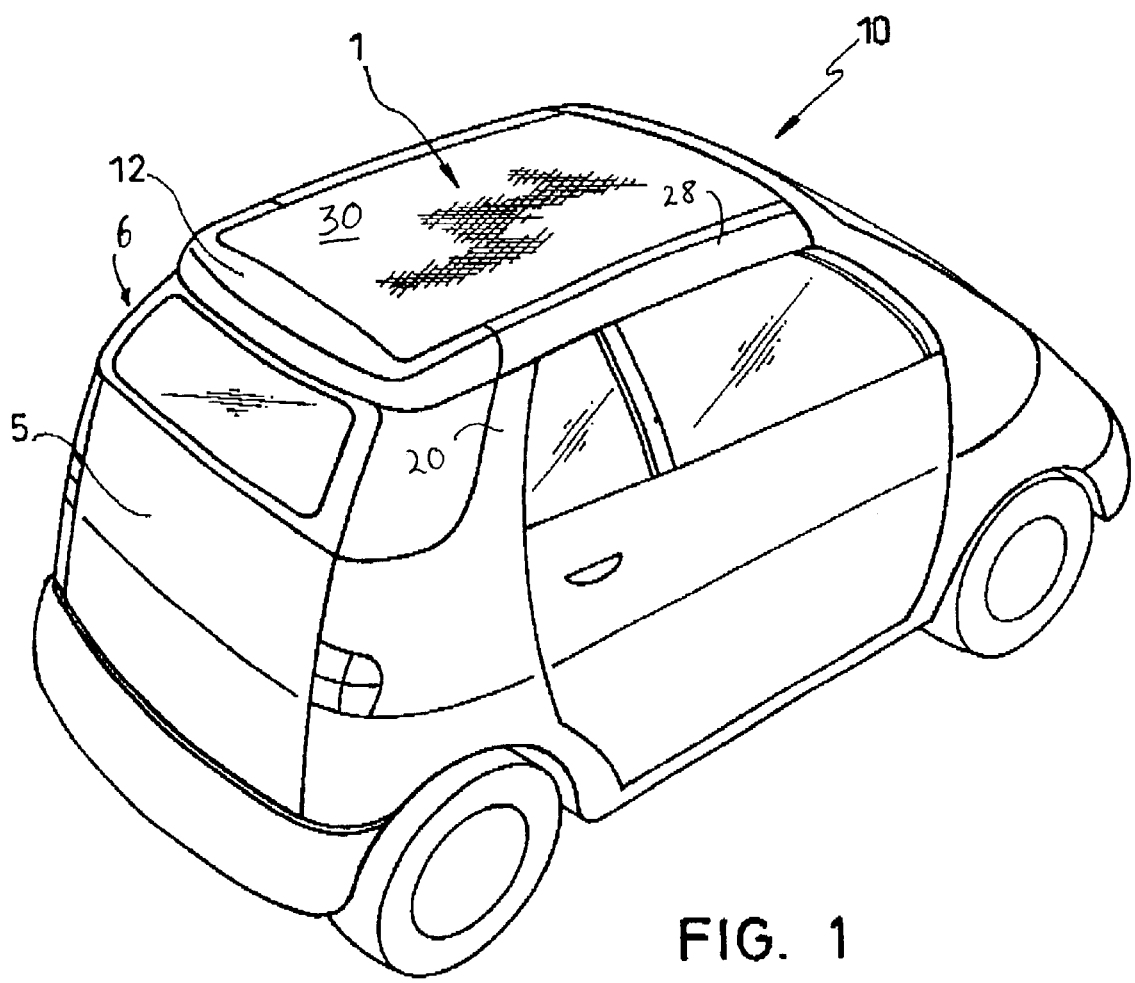
FIG. 1 is a perspective view of a motor vehicle with a temporarily stationary roof part which is made as a roof cassette and a folding roof as the openable roof part, the roof cassette being fixed by means of a closing device on a thrust bearing which is attached to the B-column of the motor vehicle and the folding roof being in its closed position.
Figure 2:
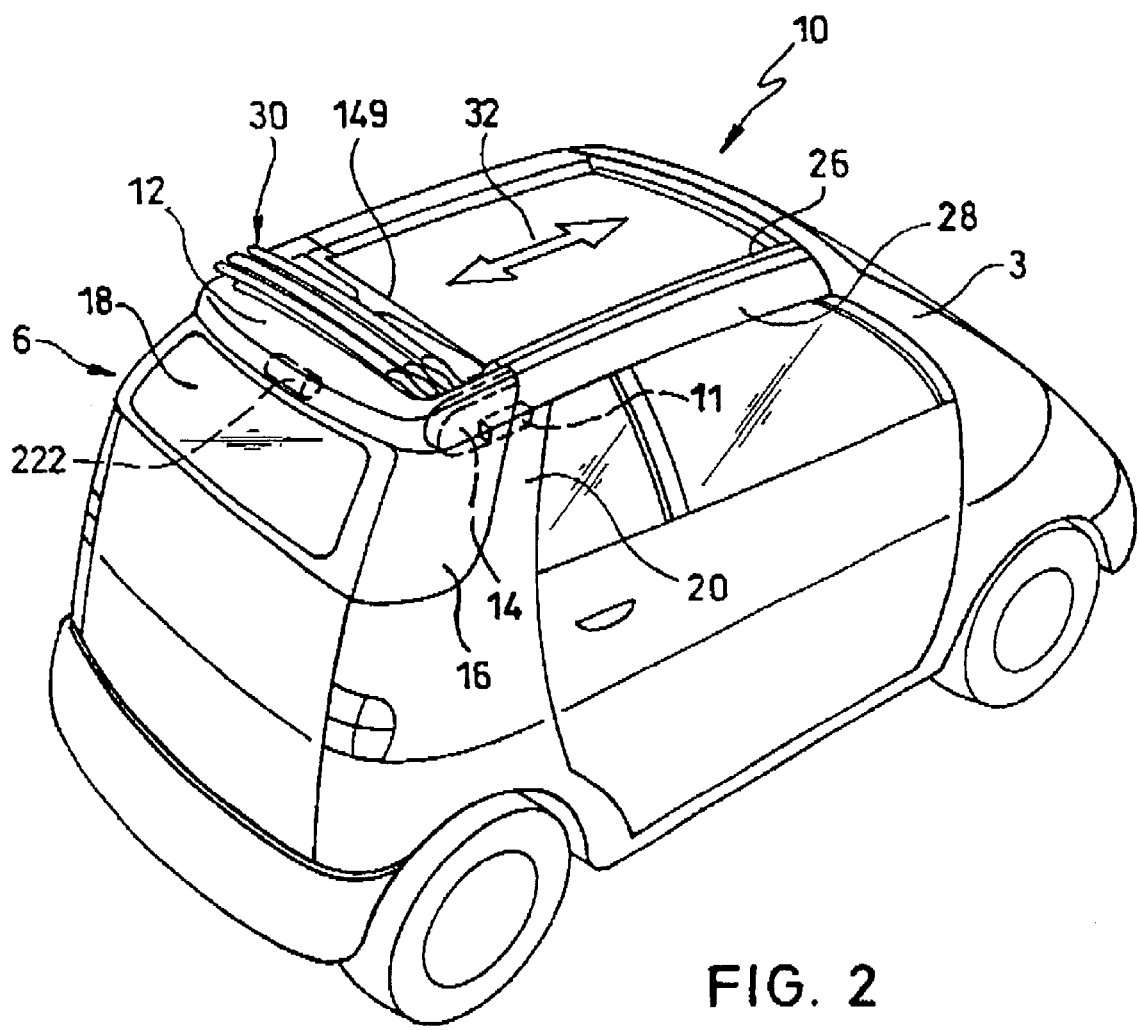
FIG. 2 is a perspective view of the motor vehicle from FIG. 1 with the folding roof in the open position.
Figure 3:
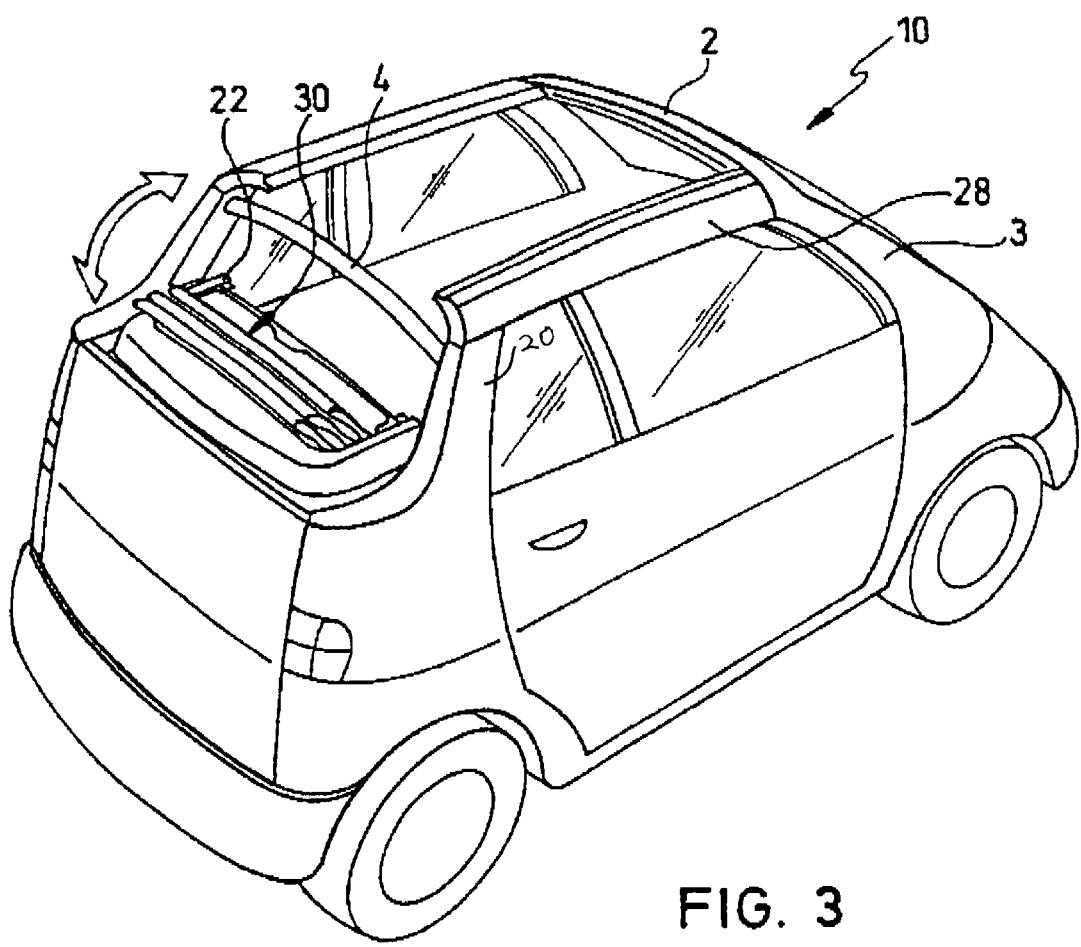
FIG. 3 is a perspective view of the motor vehicle from FIG. 1, the roof cassette, together with folding roof which is in the open position, being lowered into a rest position.

In the context of the invention disclosed and claimed in this application, the terms "temporarily stationary roof part," and "at least temporarily fixed roof part" should be given the following meaning. In a roof of a motor vehicle having a "sunroof configuration" in which at least one movable part can be displaced, even during driving, to expose and close a defined opening in the vehicle roof and also having a "convertible configuration" in which the roof as a whole has been lowered to create a convertible-like open roof, the "temporarily stationary roof part" means a part that remains stationary relative to the vehicle body whenever the roof is in its "sunroof configuration" but which is moved to change the roof into its "convertible configuration" and the term "at least temporarily fixed roof part" means a part which is fixed relative to vehicle body whenever the roof is in its "sunroof configuration" and which may remain so fixed when the roof is changed into its "convertible configuration" or may be moved or removed during and/or after changing of the roof from its "sunroof configuration" into its "convertible configuration." In this context, the below-described examples of "temporarily stationary" roof parts and "at least temporarily fixed" roof parts should not be viewed as limited exclusively to such parts.

FIGS. 1 to 6 show a motor vehicle 10 with a motor vehicle roof 1 which comprises an openable roof part which can be actuated by a drive motor which is an electric motor 222, a temporarily stationary roof part, an at least temporarily fixed roof part, a rear part 6, and side members 28. The openable roof part, in this example, is a folding roof 30 which is movably accommodated in guides of the temporarily stationary roof part and in those of the side members 28 so that it can be moved, in the opening and closing direction 32, between its open position (see, FIGS. 2, 3 and 5) and its closed position (see, FIGS. 1 and 6) as well as into any intermediate positions between its open and closed positions. In the open position, the folding roof 30 is supported in the temporarily stationary roof part which, in the embodiment shown, is the rear roof part of the motor vehicle roof 1 which is made as a roof cassette 12, all parts of the folding roof 30 which can be moved in the guides can be held in the guides which are located in the roof cassette 12 and can be locked with reference to the roof cassette 12, as is explained below in conjunction with FIGS. 7 to 12. In doing so, the folding roof 30 is pushed to so far to the rear in the direction of opening 32 in the open position, such that the front edge 149 of the folding roof 30 lies essentially flush with the front edge of the roof cassette 12.

Figure 4:
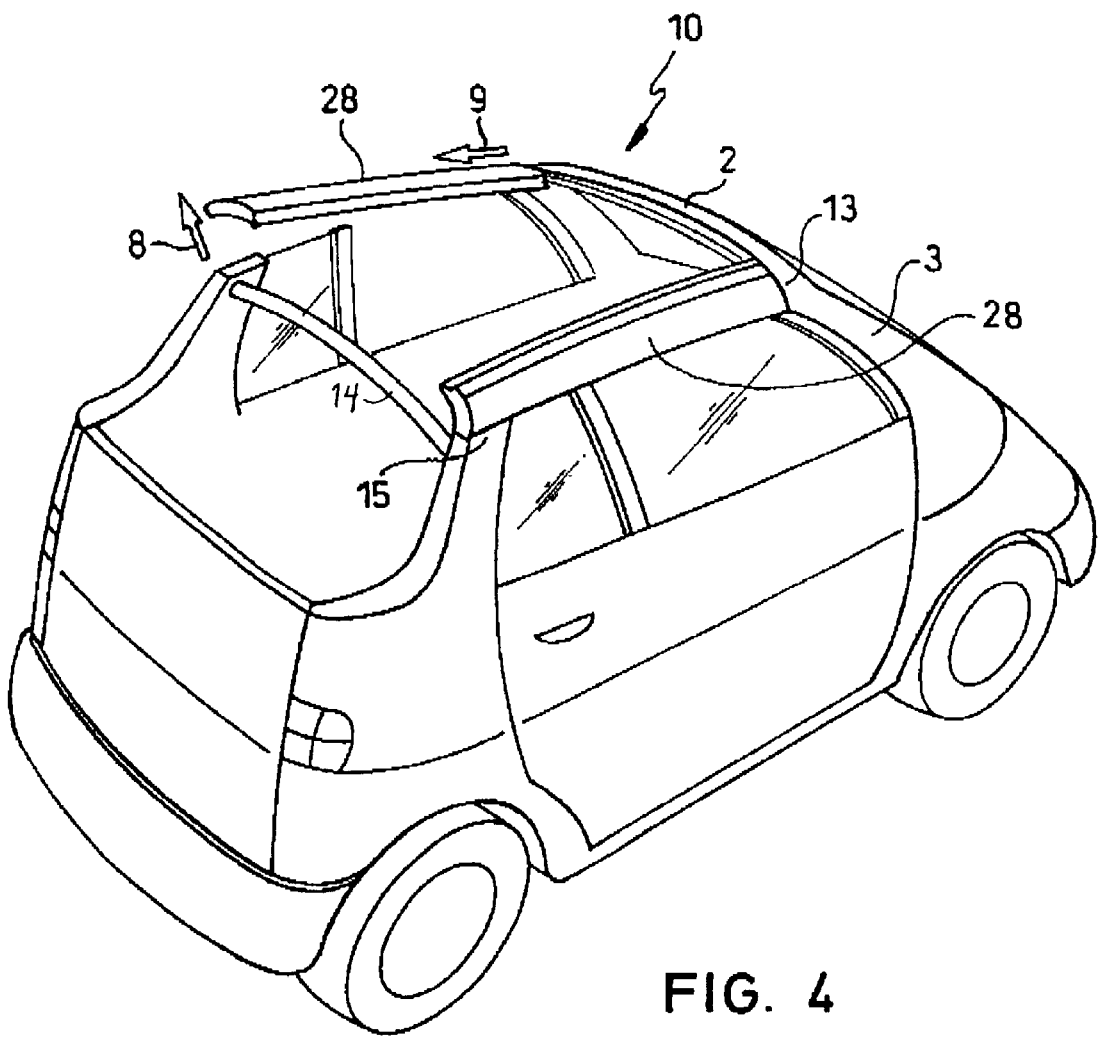
FIG. 4 is a perspective view of the motor vehicle from FIG. 1, in which the roof cassette is not shown for reasons of clarity, dismounting of side members which extend between the B-columns and the front cross beam which runs above the windshield being illustrated.
Figure 5:
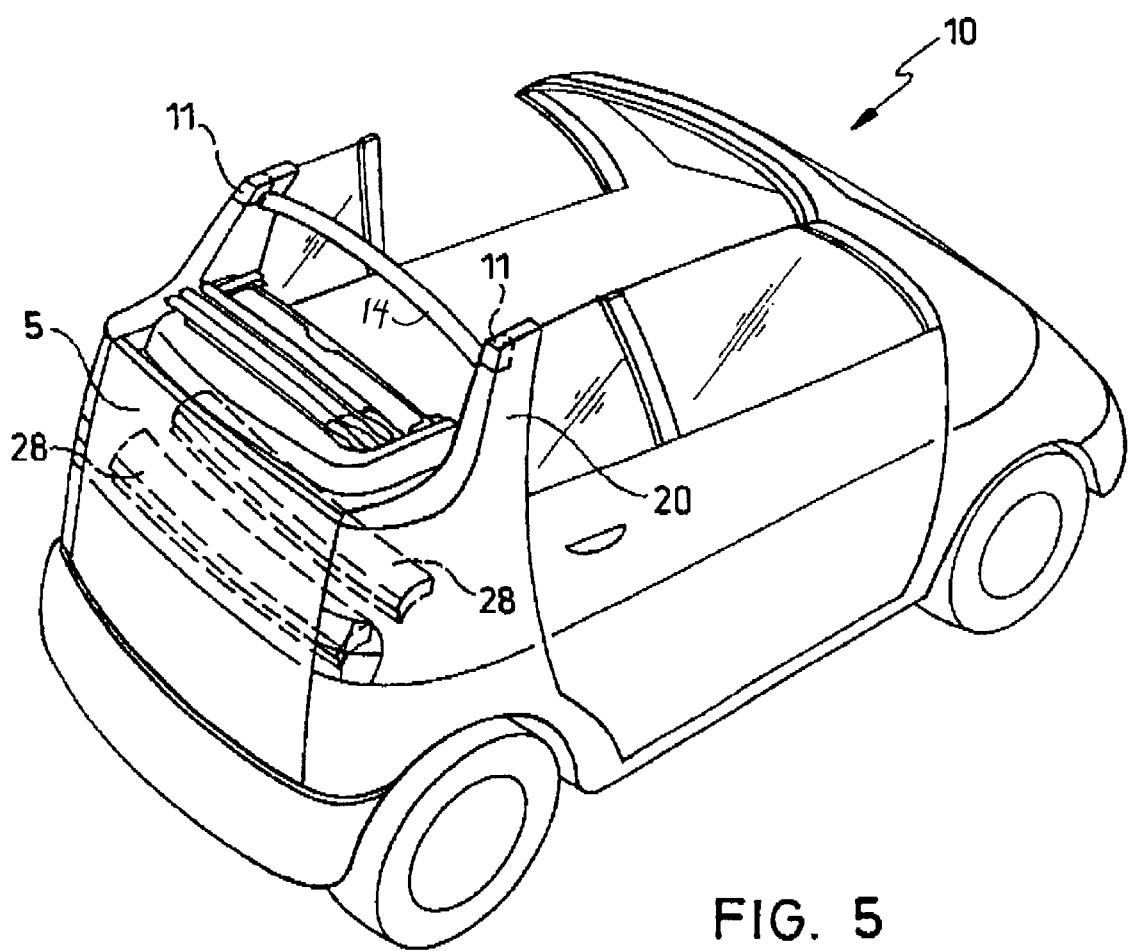
FIG. 5 is a perspective view of the motor vehicle from FIG. 1 with the side members dismounted and the roof cassette lowered.

The guides which are located in the roof cassette 12 are formed by guide rail sections 22 which are attached to closing devices 14 which, for their part, are fixed on the roof cassette 12, the guide rail sections 22 being aligned with the front guide rail sections 26 when the roof cassette 12 is locked with reference to the at least temporarily fixed roof part. The front guide rail sections 26 form the guides which are present in the side members 28 and are accommodated in a resiliently supported manner in the side members 28 (see, commonly owned, co-pending U.S. patent application Ser. No. 09/593,437, entitled "MOTOR VEHICLE ROOF GUIDE RAIL" and which claims priority of German Patent Application No. 199 27 234.4-21). The side members 28 are detachably joined to the motor vehicle 10 via front side member bearings 13 in the area of the joint between the front cross beam 2 which runs above the windshield and the front side columns (A-columns 3) and via rear side member bearings 15 in the area of the top end of the rear columns (B-columns 20) which form the at least temporarily fixed roof part. To dismount the side members 28, as shown in FIG. 4, first the rear side member bearings 15 are unlocked, the rear end of the side members 28 are raised in the direction of the arrow 8 and then are pulled in the direction of the arrow 9 to the rear out of the front side member bearings 13. The dismounted side members 28 can be placed in a storage compartment in the motor vehicle 10, for example, in a rear door 5.

In the embodiment of the motor vehicle roof I as shown in FIGS. 1 to 6, the rear side columns, i.e., the B-columns 20, constitute the at least temporarily fixed roof part. Between the B-columns 20 which, in this case, are permanently rigidly connected to the motor vehicle body, a rear cross beam 4 can extend in the manner of a roll bar. As an alternative to the permanently fixed arrangement of the B-columns 20, they can also be made lowerable. A closing device 14 is attached to the side of the roof cassette 12 on each of the left and right side relative to the direction of vehicle travel represented by arrow 32 (FIG. 2) and interacts with a thrust bearing 11 which is fixed near the top end of each of the B-columns 20 in order to effect locking and unlocking of the roof cassette 12 relative to the B-columns 20, i.e., the locking and unlocking which can be actuated via the electric motor 222.

Figure 11:
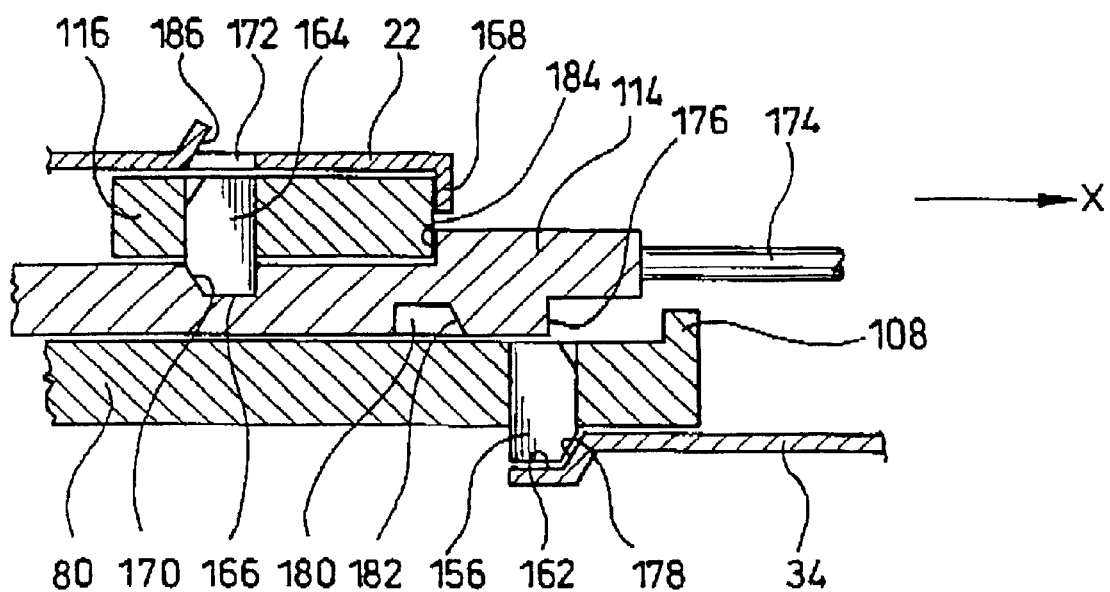
FIG. 11 is a schematic partial section along the line 11—11 in FIG. 7, illustrating the bolt block couplings of a driving slider which can be moved by a motor to a link body which controls the motion of the locking hook of the closing device and to a roof front edge of the folding roof.

Actuation of both locking and unlocking of the roof cassette 12 with reference to the thrust bearings 11 and also actuation of the opening and closing motion of the folding roof 30 are ultimately accomplished by a driving slider 114 which is moved via a compressively stiff cable 174 by the electric motor 222 which is located in the middle rear area of the roof cassette 12 and its manner of operation is explained in further detail below, especially with respect to FIG. 11.

Figure 6:
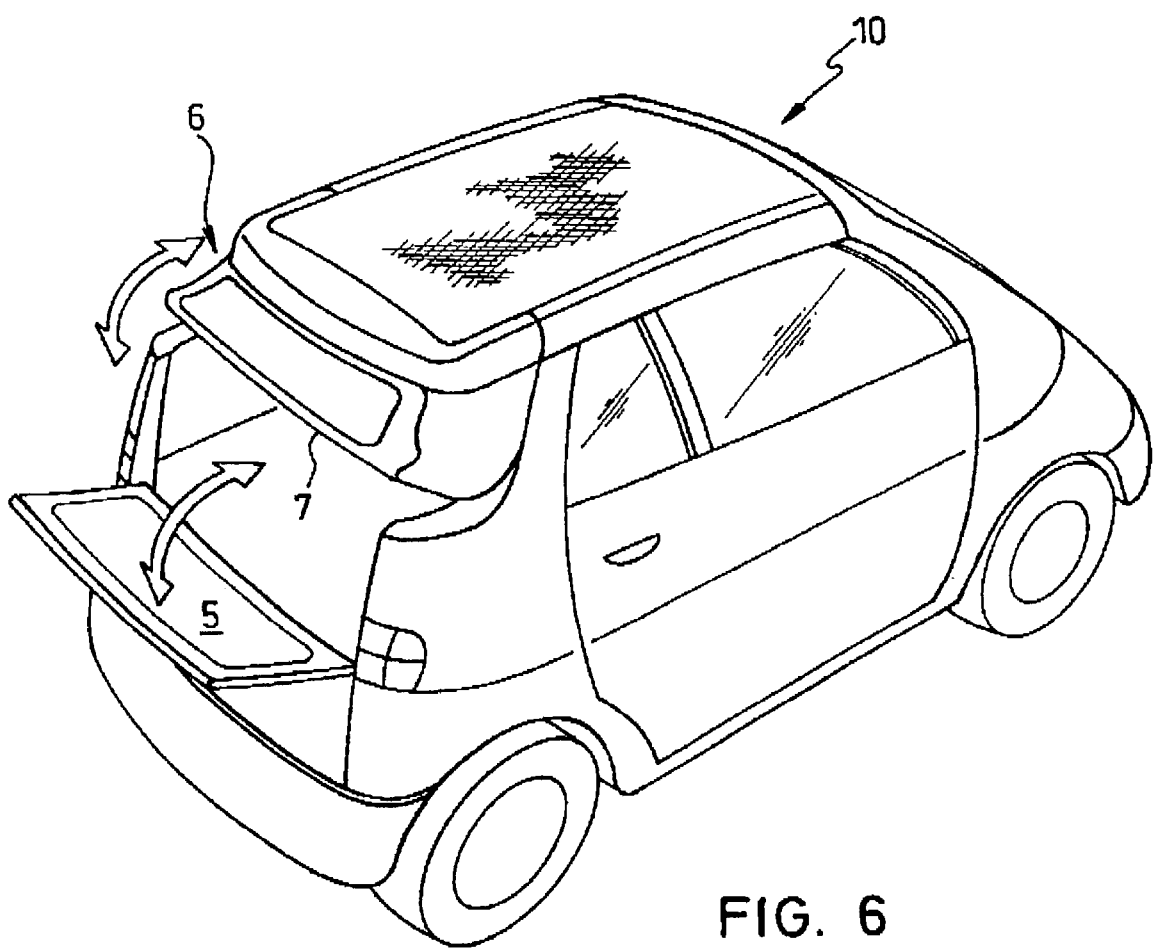
FIG. 6 is a perspective view of the motor vehicle from FIG. 1 with the folding roof closed, the bottom of the rear part which comprises the rear window of the motor vehicle being decoupled from the rear door of the motor vehicle and swung upward, and the rear door of the motor vehicle being in the opened position.

The rear part 6 of the motor vehicle roof 1 is fixed on the roof cassette 12 and comprises a rear window 18 of foldable plastic and likewise foldable side parts 16. The roof cassette 12 is connected to the vehicle body via a four-bar arrangement (not shown), and after unlocking from the thrust bearing 11 of the B-columns 20, can be lowered to such an extent that the top of the roof cassette 12 comes to rest essentially at the height of the equator of the motor vehicle. To lock the roof cassette 12 in the lowered position, on the four-bar arrangement itself, there is likewise a thrust bearing with which the closing device 14 interacts in a similar manner as with the thrust bearing 11. The bottom 7 of the rear part 6 can be placed against the rear door 5, and as is shown in FIG. 6, can be swung up in order to improve access to the stowage space. The rear door 5, for its part, is pivotally connected at its bottom to the motor vehicle body and can be swung down independently of the position which the bottom 7 of the rear part 6 assumes and also with the roof cassette 12 lowered. To increase the stability of the rear part and to attach a lock latch for the rear door 5, a cross beam can be provided on the bottom 7 of the rear part 6.

In the following, using FIGS. 7 to 12, two embodiments of the closing device 14 are explained. On the roof cassette 12, two mirror image closing devices are attached, but only the closing device 14 which is on the left when viewed in the direction of travel is shown in the figures. All statements with respect to the left closing device 14 also relate analogously to the mirror-image right closing device. It is furthermore noted that the axis labelled X in FIGS. 7 to 11 points in the opening direction of the folding roof 30, parallel to the arrow 32 in FIG. 2, i.e., toward the back of the vehicle.

The two closing devices are mounted symmetrically with respect to an axis of symmetry which runs in the lengthwise direction of the motor vehicle within the roof cassette 12 near its side outer surfaces such that they can be fixed on the thrust bearings 11 which are attached to the B-columns 20, and at the same time, the guide rail sections 22 of the closing devices 14 are aligned flush with the front guide rails sections 26 of the side members 20 by engaging an alignment strip 24 which is fixed on the guide rail section 22 as an alignment element which engages the front guide rail sections 26.

Figure 7:
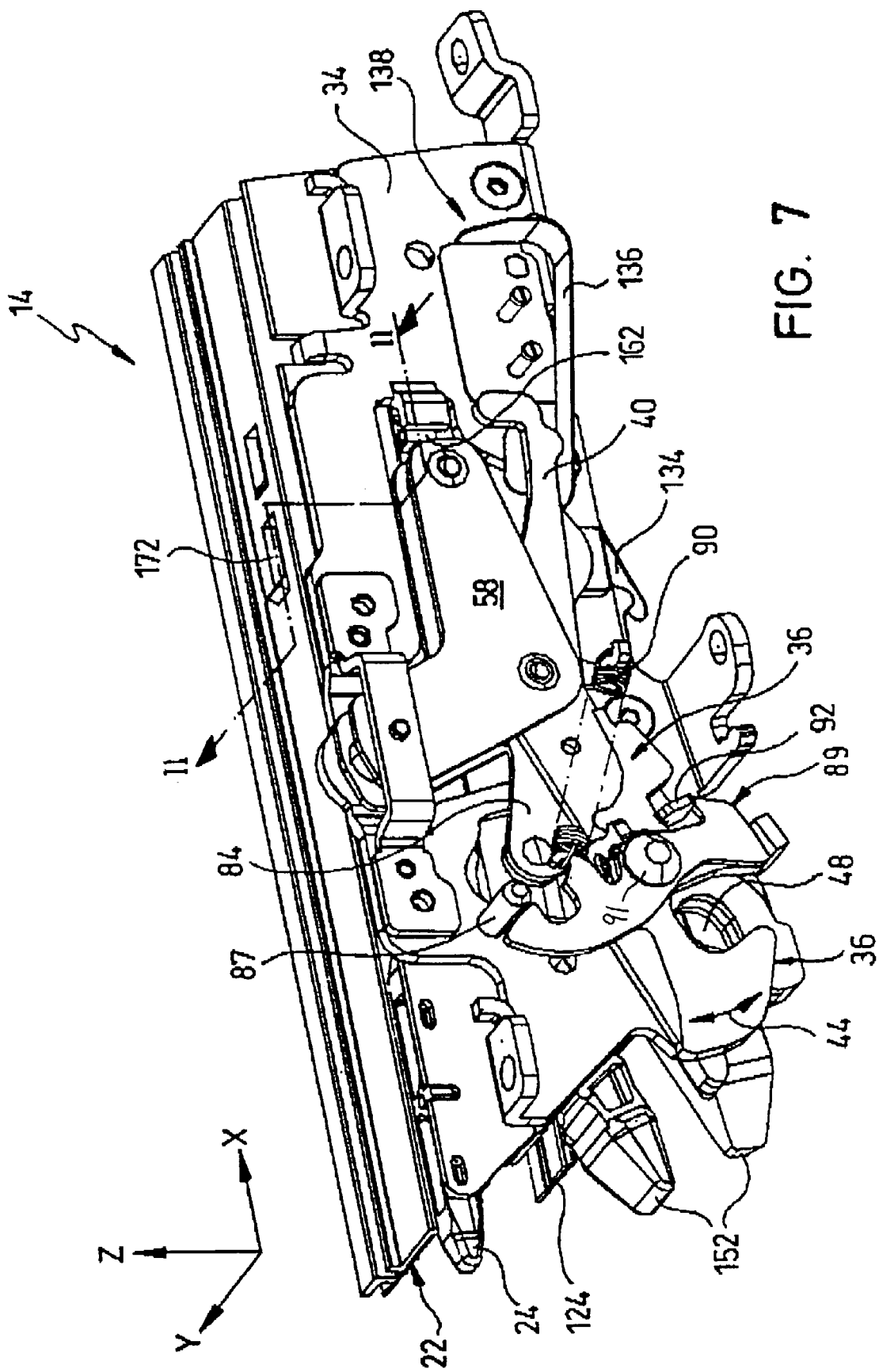
FIG. 7 is a perspective view of the closing device of the roof cassette, a locking hook of the closing device being located in the rear catch position in the locking position.
Figure 8:
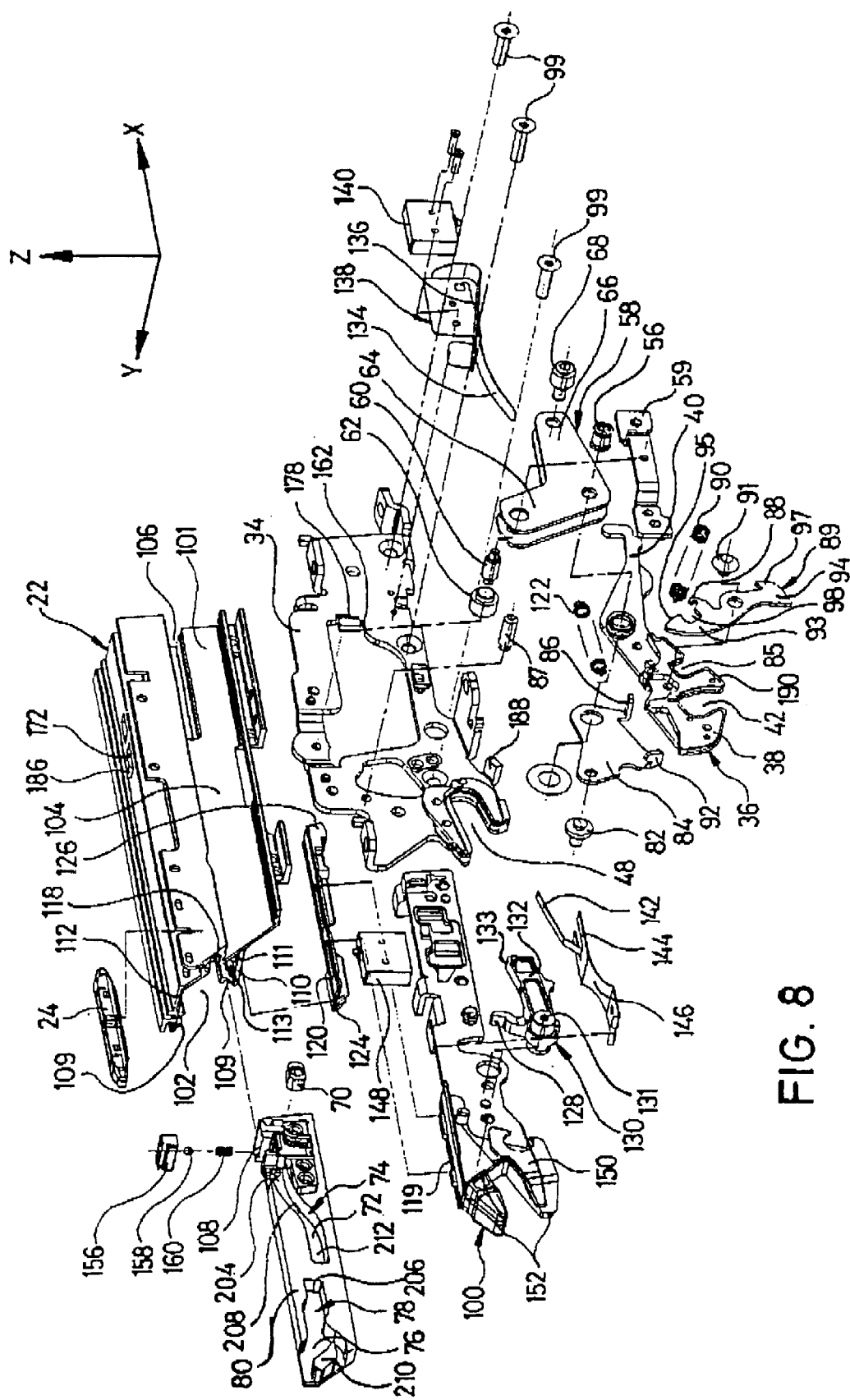
FIG. 8 is an exploded view of the closing device from FIG. 7.
Figure 9:
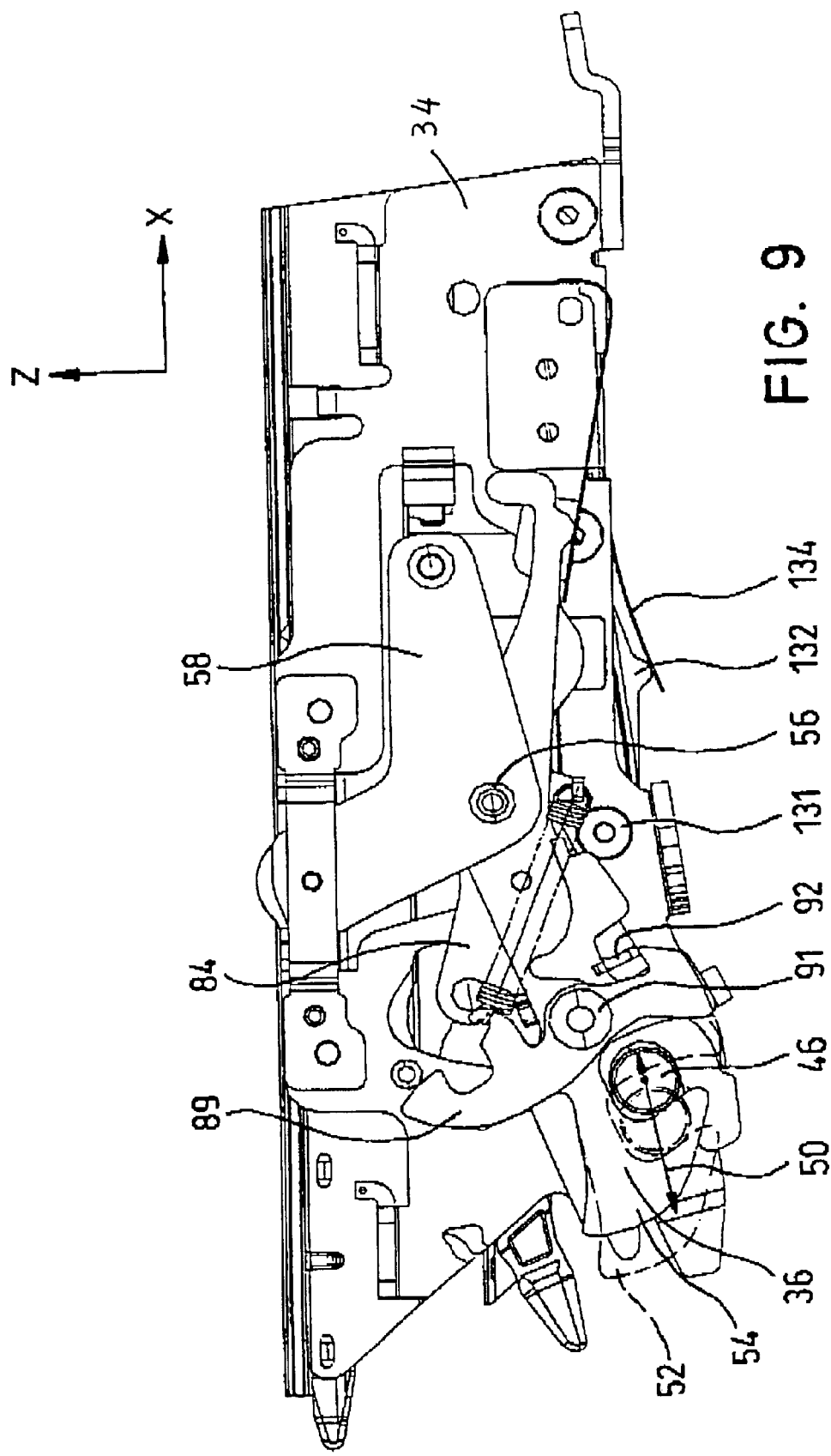
FIG. 9 is a side view in the direction to the bearing plate of the closing device from FIG. 7.
Figure 10:
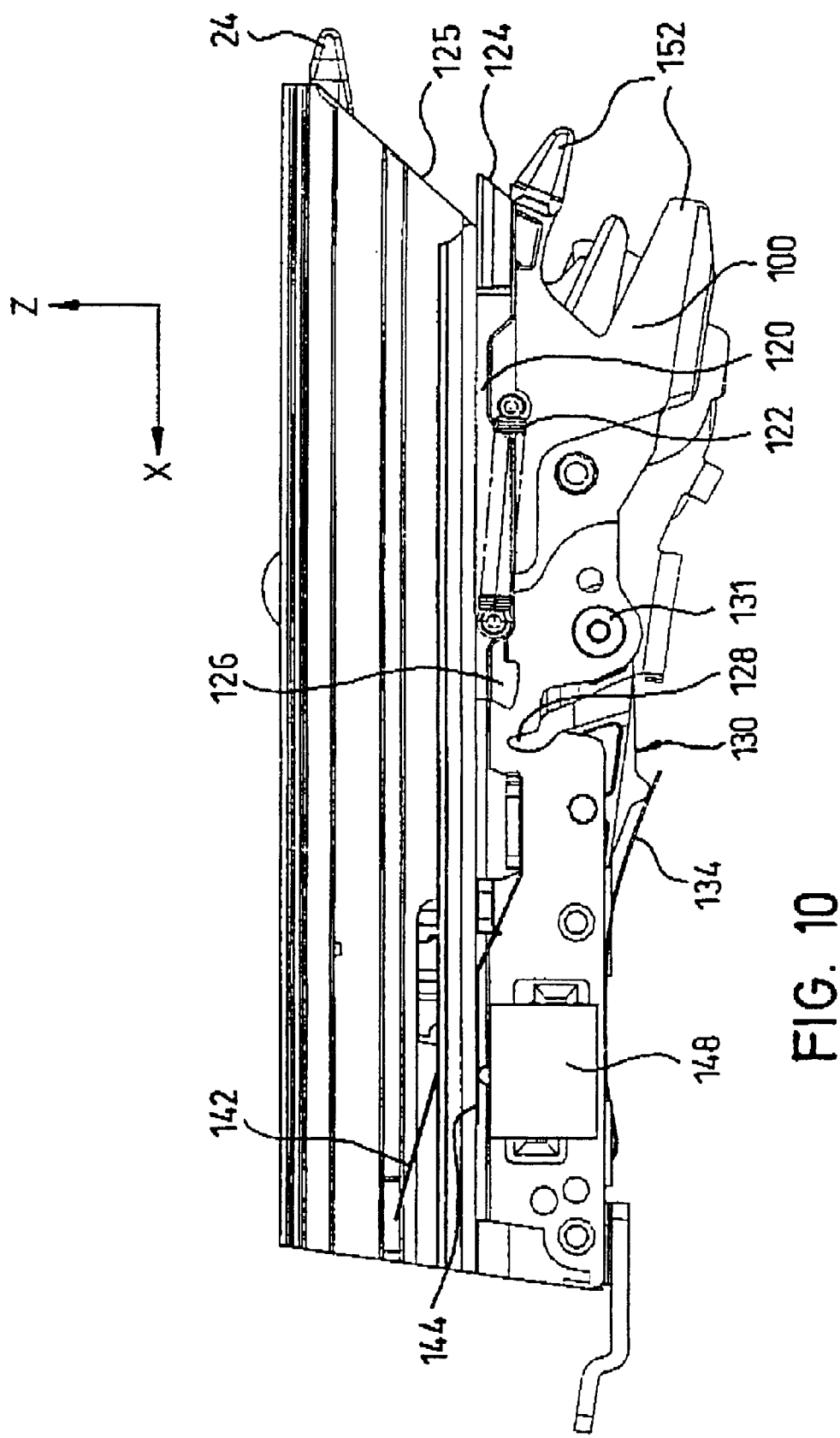
FIG. 10 is a side view in the direction to the guide rail of the closing device from FIG. 7.

The closing device 14 comprises a bearing plate 34 with a receiving element which is made as a receiving groove 48 and into which a pin 46 of the thrust bearing 11 which is attached to the B-column 20 can be inserted in the displacement direction 50 (FIG. 9) and can be locked in the receiving groove 48 by a locking hook 36 which has a locking groove 42 that engages the bearing 11 from a direction blocking egress from receiving groove 48. Here, the locking groove 42 is placed in the front arm 38 of the locking hook 36 which is pivotally mounted on a bearing pin 56 in an angled bearing lever 58. The bearing pin 56 of the locking hook 36 is located roughly in the middle between the front arm 38 which contains the locking groove 42 and a rear arm 40, and the locking hook 36 pivot around the axis of the bearing pin 56 in the directions 44 (see FIG. 7) between a locking position and a release position which are shown in FIGS. 7, 9 & 10. Furthermore, in the locking position, the locking hook 36 can be shifted in the displacement direction 50 between a front catch position 52 which is shown in FIG. 9 in broken lines and a rear catch position 54 shown in solid lines.

The bearing lever 58 is made in two parts and comprises two congruent halves which are spaced apart in the Y-direction by the thickness of a sleeve 62; their distance is such that the locking hook 36 and another control lever 84, which is described below, can be accommodated between them. The sleeve 62 is pushed onto an axle 60 which penetrates an arm 64 of the bearing lever 58 in the Y-direction such that it projects above the halves of the bearing lever 58 on either side, and on the one hand, is held in the bearing plate 34, and on the other hand, is held in a bearing clip 59 which fits around the arm 64 and which, for its part, is fixed on the bearing plate 34. The bearing lever 58 can be pivoted around the axis 60 by means of a control pin 68 which is fixed on its second arm 66, the control (cam follower) pin 68 projecting from the bearing lever in the Y-direction and fitting into a control (cam) path 72 of a control link 74 in which it is guided via a slide block 70.

The control link 74 is integrated in a link body 80 which has a second control link 78, in the control path 76 of which a control pin 82 which is fixed on the control lever 84 is movably accommodated and causes its pivoting motion around the axis of the bearing pin 56, by means of which the control lever 84, jointly with the locking hook 36, is supported in the bearing lever 58, a control lever extending in the direction to the front arm 38 of the locking hook 36. A bent flange 92 of the control lever 84 fits into a recess 85 of the locking hook 36, which recess is open in the Z-direction, and is used to drive the locking hook 36 when the control lever 84 is pivoted clockwise by the control pin 82 as it moves along the control path 78 (the terms clockwise and counterclockwise used here relate to viewing in the Y-direction).

A retaining lever 89 is pivotally mounted roughly in the middle by an extension pin 91 on the locking hook 36 in the area between the recess 85 and the locking groove 42, a tension spring 90 being provided between a projection 88 which is located on the first arm 93 of the retaining lever 89 and a bent flange 86 of the control lever 84. By means of the tension spring 90 a pretension is impressed clockwise on the control lever 84 such that the bent flange 92 of the control lever 84 fits without play in the recess 85 of the locking hook 36, and at the same time, the retaining lever 89 is also pivoted clockwise against the prestressed holding pin 87 which is fixed on the bearing plate 34 and which extends in the Y-direction by means of a sloped surface 95 which is provided on its first arm 93, if the locking hook 36 is located outside of its release position. The sloped surface 95 which is located in the first arm 93 of the holding lever 89 above a catch area 98, which is open essentially in the X-direction, is made such that a force is exerted on the locking hook 36 via the pre-tensioned contact of the sloped surface 95 with the holding pin 87, so that the locking hook 36 turns counterclockwise around the axis of the bearing pin 56, and the locking hook 36 rests on a bent flange 188 of the bearing plate 34 via a slide surface 190 which runs in the displacement direction and which lies, when viewed in the lengthwise direction of the vehicle 10, behind the locking groove 42 (i.e., it is arranged offset from the locking groove 42 in the positive X direction). Furthermore, the holding pin 87 is used as a capture device into which the catch area 98 of the retaining lever 89 fits when the locking hook 36 is in its release position.

A second arm 94 of the retaining lever 89, which is located underneath the extension pin 91 (i.e., is offset with reference to it in the negative Z direction), has a projection 97 which protrudes upward essentially in the X direction and which, in order to fix the control lever 84 with reference to the locking hook 36, can engage against the bottom of the bent flange 92 of the control lever 84 as soon as the locking hook 36 approaches its rear catch position 54.

An alignment plate which extends essentially in the X direction, and which is labeled 100 as a whole, is connected to the bearing plate 34 via several screws 99 which, at the same time, penetrate the lower area of the guide rail section 22 which is fixed directly on the bearing plate 34 in its top area, in addition, via blind rivets (not shown), so that strong cohesion of the bearing plate 34, the guide rail section 22 and the alignment plate 100 are achieved. The guide rail section 22 has a bottom and a top slide way 101 and 102 which are separated from one another by a partition 104 which runs in the X-Z plane. The lower slide way 101 is bounded laterally by the partition 104 and the rear wall of the bearing plate 34 and to the top and bottom by legs which extend proceeding from the partition 104 in the −Y direction, and is open in the +/−X direction. It is used for accommodation of the link body 80 which, for its part, has a stopping edge 108 which projects upward in the Y direction and which extends through an opening 106 in the partition 104 into the area of the slide way 102; this accommodation can be moved in the +/−X direction. Here, the link body 80 can be moved in the +/−X direction between a rear end position and a front end position.

The slide way 102 is bounded to the top and bottom by legs 112 and 110 which extend in the Y direction and by means of fixed links 109 which are located vertically on the legs 110 and 112 is divided into two open chambers 111, 113, of which the inner chamber 110 is used to accommodate a driving slider 114 and the outer chamber 113 is used to accommodate the slider slider 116 of the roof tip. Both sliders 114 and slider 116 can be moved in the +/−X direction, on the driving slider 114 a compressively stiff cable 174 being attached which can be moved via the electric motor 222 which is fixed on the roof cassette 12 (see FIG. 2) and is guided in a cable channel 118 which is held laterally next to the slide way 102 in the partition 104.

Between the top 119 of the alignment plate 100 and the bottom of the leg 110, a probe slider 120 which can be moved in the +/−X direction is held as part of a thrust bearing detection means which is pretensioned by the action of a tension spring 122 which is attached between the probe slider 120 and the alignment plate 100 in the -X direction such that its probe tip 124 projects from the front edge 125 of the guide rail section 22. On the end of the probe slider 120, which is opposite the probe tip 124 viewed in the X-direction, there is a releasing device 126 which interacts with a release arm 128 of an angled catch lever 130 which, for its part, is mounted to pivot around an axis 131 between the bearing plate 34 and the alignment plate 100. On the arm 132 of the catch lever 130, extending essentially perpendicular to the release arm 128, there is a catch projection 133 which is designed to fit into a stopping edge which is formed in a complementary manner, but which is not shown, on the bottom of the link body 80 when the link body 80 stops in a warning position which is located behind its front end position. Here, the warning position of the link body 80 is located with reference to the bearing plate 34 at a point which is located between the front position and the rear end position of the link body 80, the front end position corresponding to a smaller X-coordinate than the rear end position.

The catch lever 130 is loaded counterclockwise by means of a spring arm 134 of a combination spring 138 which has two spring arms 134 and 136 so that the catch projection 133, with the link body 80 in the warning position, is pre-tensioned against its stopping edge and prevents the link body 80 from reaching its forward end position, if the thrust bearing 11 is not located in its specified position with reference to the closing device 14. The link body can be moved in this case only between its rear end position and its warning position. Conversely, if in the process of coupling the closing device 14 to the thrust bearing 11, the specified position of the thrust bearing 11 is reached relative to the closing device, the probe tip 124 of the probe slider 120 makes contact with the thrust bearing 11, the probe slider 120 is pushed in the X direction against the force of the tension spring 122 so far that the releasing device 126 actuates the release arm 128 of the catch lever 130 and pivots the catch lever 30 clockwise around the axis 131 against the action of the spring arm 134, and the catch projection 133 of the catch lever 130 disengages from the stopping edge on the bottom of the link body 80. The link body 80 can now be pushed further forward (therefore in the −X direction) in the direction to its front end position. The second spring arm 136 of the combination spring 138 is pretensioned upward in the Z-direction and can be deflected downward against its pretensioning by the rear arm 40 of the locking hook 36 when the locking hook 36 is in its release position. In doing so, the spring arm 136 in its upwardly pretensioned base position actuates an electric microswitch 140 which is fixedjointly with the combination spring 138 on the bearing plate 34, the microswitch 140 delivering a corresponding signal "locking hook in the locking position." This signal is supplied as the input quantity to the electrical control 218 which controls the motorized actuation of the closing device 14 (FIG. 13) and which likewise assumes control of the motorized actuation of the opening and closing motion of the folding roof 30.

Furthermore, it can be provided for the spring arm 136, instead of its elastic pretensioning upward, to be connected by form-fit to the rear arm 40 of the locking hook 36 so that the latter actuates the spring arm 136 in both directions, i.e., up and down.

Alternatively to the interaction of the probe tip 124 of the probe slider 120 with the thrust bearing, there can also be interaction of the probe tip 124 with the side member 28, when the side member 28 is in the specified position and it is locked especially to the vehicle the probe slider 120 in the coupling process of the closing device 14 to the thrust bearing being actuated by the side member 28 and being pushed in the X direction so far that the catch projection 133 of the catch lever 130 no longer locks the link body 80 in its warning position. If the side member 28, on the other hand, is removed from the vehicle or it is not located, for some other reason, in its specified position with reference to the closing means 14 in the coupling position, the probe tip 124, in the coupling process, is not actuated or is not actuated far enough in the X direction and the link body 80 locks when it reaches its warning position even if the thrust bearing is in the specified position. Thus, the thrust bearing detection means is, in principle, used for side member detection. This has the further advantage that, when the closing device 14 is coupled to the other thrust bearing which is attached to the quad joint, the link body 80 cannot be pushed any further than into its warning position, since the thrust bearing which is provided on the quad joint is in the specified position, but there is no side member. This prevents the locking of the roof front edge slider 116, which is described further below, from being released with reference to the closing means 14, when the closing device 14 is coupled to the thrust bearing of the quad joint.

An alignment fork 152 on the front end of the alignment plate 100 is used to align the closing device 14 in the Y and Z direction with reference to the front guide rail section 26, for which purpose the alignment fork 152 fits into an alignment bearing which is shaped in a complementary manner and which forms a unit with the front guide rail section 26 which is supported resiliently on the side member 28. The alignment strip 24, which is fixed on the guide rail section 22 of the closing device 14 and which is located in the Z direction above the alignment fork 152 and can be caused to engage the front guide rail section 26, prevents tilting around the X-axis of the front guide rail section 26 with reference to the guide rail section 22. The alignment surface 150 is placed on a side surface of the alignment fork 152 in the X-Z plane and can be placed against the end face of the pin 46 of the thrust bearing 11 which is attached to the B-column 20, so that in interaction with the mirror-image right closing device and the right pin, the alignment of the entire roof cassette 12 takes place with reference to the two pins 46 of the thrust bearing 11, this alignment being symmetrical when viewed in the Y-direction.

On a bent flange of the alignment plate 100, which bent flange runs in the Y-direction, an end position spring 146 is fixed which comprises two spring arms 142 and 144, of which the spring arm 142 fits from underneath into the chamber 113 in which the roof front edge slider 116 is held which is connected to the roof front edge 149 of the folding roof 30 and which causes the opening and closing motion of it. The second spring arm 144 is designed to mechanically actuate an electrical microswitch 148 when the roof front edge slider 116 is in the holding position, the microswitch 148 delivering the signal "roof front edge in the holding position" to the electronic control 218 (see, FIG. 13). In this position, the roof front edge slider 116 is held completely in the guide rail section 22 of the closing device 14 and can be locked with reference to the guide rail section 22. With the roof front edge slider 116, all movable parts of the folding roof 30 are held in the guide rail section 22 and can be decoupled together with the roof cassette from the thrust bearing 11.

Figure 12:
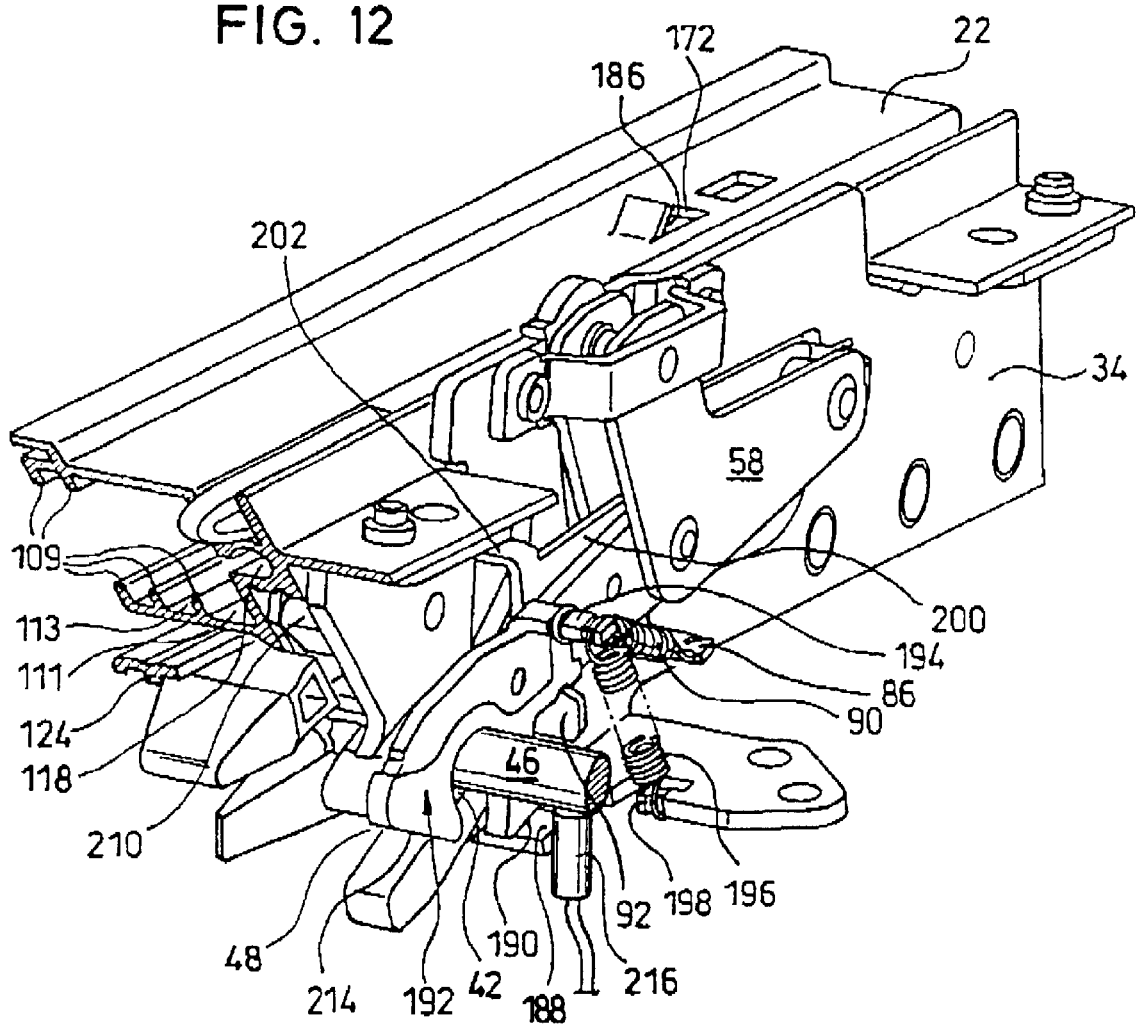
FIG. 12 is a perspective view of a modified embodiment of a closing device, the locking hook thereof being in its rear catch position in the locking position.
Figure 13:
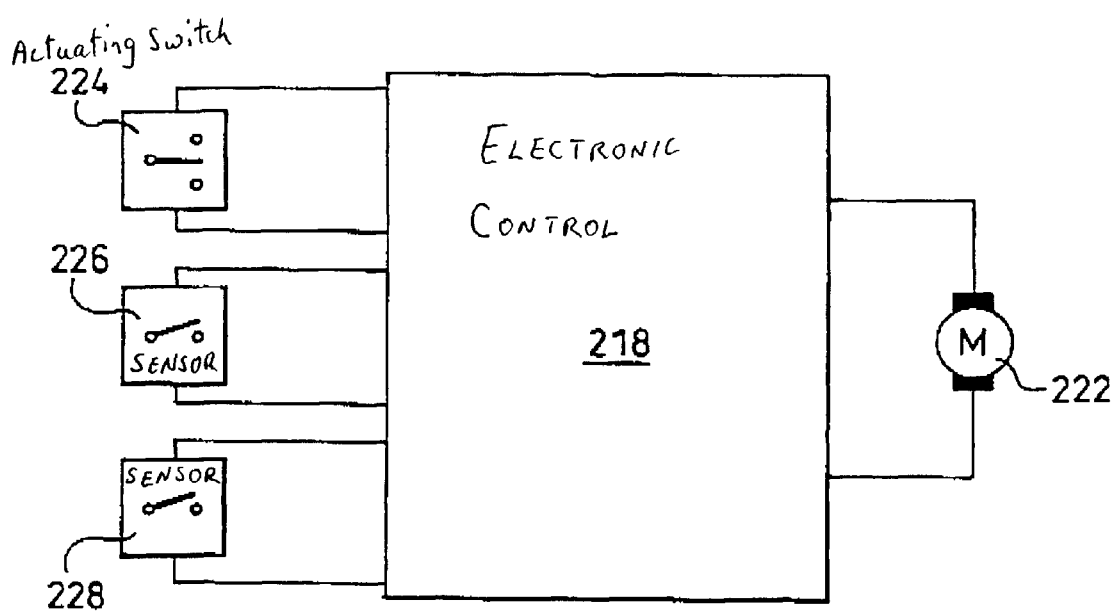
FIG. 13 is a schematic of a control for the motor vehicle roof.

As is apparent from FIG. 13, in addition to receiving the signals of an actuating switch 224 which has two operating positions ("open" and "close"), the control 218 for the motor vehicle roof also receives signals of two sensors 226 and 228 as input quantities. The actuating switch 224 can be operated by the operator and is used to initiate both the opening and closing motion of the folding roof and also the coupling and decoupling motion of the closing device, via the pivoting and displacement motions of the locking hook, the locking and unlocking of the roof cassette 12 with reference to the thrust bearings 11 on the B-columns 20 being caused. As an alternative to one actuating switch 224, there can be two actuating switches, of which one initiates the opening and closing motion of the folding roof and the other the coupling and decoupling motion of the closing device when the folding roof is completely opened. The two sensors 226 and 228, in the case of the first embodiment of the closing device (shown in FIGS. 7 to 11), are the microswitches 148 and 140. In the second embodiment of the closing device which is described further below in conjunction with FIG. 12, an inductive sensor 216 is used as the sensor 228 instead of a microswitch 140.

With the folding roof 30 closed, the roof front edge slider 116 and the driving slider 114 are located in the front guide rail section 26 and are joined to one another by form-fit by means of a bolt block 164 which is movably held in the Z direction in the roof front edge slider 116. The roof cassette 12 is fixed via the closing devices 14 on the B-columns 20 of the motor vehicle 10, the locking hook 36 stopping in the locking position in its rear catch position 54. The link body 80 is in its front end position, and in the latter, is held in a recess 162 of the bearing plate 34 by a bolt block 156 which is movably supported in the Y direction and which can catch in its end positions by means of a ball 158 which is loaded via a compression spring 160 (see, FIG. 8). While the control pin 68 which controls the pivoting motion of the bearing lever 58, and thus, the displacement motion of the locking hook 36 with the sliding block 70, is on the back end of a holding area 204 of the control path 72 of the control link 74, the control pin 82 of the control lever 84 is in the holding area 206 of the control path 76 of the control link 78 which is responsible for the pivoting motion of the locking hook 36. The retaining lever 89 is pivoted counterclockwise by its sloped surface 96 adjoining the holding pin 87 such that its projection 97 fits under the bent flange 92 of the control lever 84 and fixes it with reference to the locking hook 36. Since the position of the control lever 84, for its part, is strictly dictated by its receiver both in the bearing lever 58 (by the bearing pin 56) and also in the holding area 206 of the control link 78 (by the control pin 82), the locking hook 36 is ultimately blocked in its locking position. So that the link body 80 can be located in its front end position, of course as described above, the thrust bearing 11 and the side member 28 must be in the specified position, the probe slider 120 must be actuated and the catch projection 133 of the catch lever 130 must be disengaged with reference to the stopping edge which is located on the bottom of the link body 80.

In order to decouple the roof cassette 12 from the B-column 20, first by actuating the "open" operating position of the actuating switch 224, the folding roof 30 must be opened by the roof front edge slider 116 being pushed to the rear in the opening direction 32. The displacement motion is impressed on the roof front edge slider 116 by the driving slider 114 which, for its part, is moved by the conventional compressively stiff cable 174 via the electric motor 222 which is held in the roof cassette 12. Both the roof front edge slider 116 and also the driving slider 114 finally travel from the front guide rail section 26 into the guide rail section 22 of the closing device 14, the roof front edge slider 116, as soon as it has reached its holding position, striking a stop 168 which is provided in the guide rail section 22 and preventing further displacement of the roof front edge slider 116 to the rear (in the X direction; see, FIG. 11), also, as described above, the electrical microswitch 148 being actuated by the spring arm 144. The driving slider 114 has now reached its transfer position which is shown in FIG. 11. Furthermore, If the operator actuates the "open" operating position of the actuating switch 224, when the signal "roof front edge in the holding position" of the microswitch 148 is at the control 218, the decoupling motion of the closing device is initiated, preferably first of all, after certain safety conditions are met. To do this, for example, it can be expected that the motor vehicle should not be moving and/or the operator must keep the actuating switch 224 in the "open" position for a predetermined actuation time.

When the decoupling process is initiated, first the driving slider 114 is exposed to a force in the X direction by the electric motor 222 via the compressively stiff cable 174 so that the sloping surface 170 in a recess 166 which holds the bolt block 164 in the driving slider 114 exerts a force in the Z direction on the bolt block 164, which force is enough to displace the latter in the Z direction so far that the bolt block 164 disengages from the recess 166 in the driving slider 114 and is pushed with its end facing away from the driving slider 114 into a recess 172 in the guide rail section 22. Thus, the roof front edge slider 116 is held by form fit in the guide rail section and the driving slider 114 is released for further displacement in the X direction, the side of the driving slider 114 facing the roof front edge slider 116 being made such that release of the form-fit connection between the roof front edge slider 116 and the guide rail section 22 by displacement of the bolt block 164 in the roof front edge slider 116 in the −Z direction is precluded. After traversing a predetermined path, the driving slider 114, by means of its coupling surface 176, strikes the stopping edge 108 of the link body 80 which is located in the front end position as shown in FIG. 11, and at the same time, a recess 180 which is shaped in a complementary manner to the bolt block 156 coming to rest at the side of the driving slider 114 facing the link body 80 such that, as force continues to be exerted in the X direction on the driving slider 114, the latter entrains the link body 80 via the coupling surface 176 which adjoins the stopping edge 108, the sloped surface 178 in the recess 162 which holds the bolt block 156 in the bearing plate 34 exerting a force in the Y direction on the bolt block 156 which shifts the bolt block 156 in the link body 80 into its second end position in which the bolt block 156 disengages from the recess 162 and engages the recess 180. The bolt block 156 releases the form-fit connection of the link body 80 to the bearing plate 34, and at the same time, forms a connection between the link body 80 and the driving slider 114 which entrains the link body 80 in the direction to its rear end position. Here, the displacement of the bolt block 156 in the −Y direction out of the recess 180 is precluded, not only as a result of the spring-loaded ball 158 which keeps the bolt block 156 in its end position, but also by the fact that the side of the bearing plate 34 facing the driving slider 114 behind the sloped surface 178 is moved accordingly near the link body 80.

When the link body 80 is displaced in the X direction towards its rear end position, the sliding block 70 which is held on the control pin 68 of the bearing lever 58 travels first from the holding area 204 into a displacement area 208 of the control path 72, an area which runs to the rear in the manner of a ramp. Here, clockwise a pivoting motion is forced on the bearing lever 58 around its axis 60 and the motion is converted via the bearing pin 56 into a displacement motion of the locking hook 36, the locking hook 36 being pushed from its rear catch position 54 in the displacement direction 50 forward in the −X direction towards its front catch position 52 and sliding over its sliding surface 190 on the bent flange 188 of the bearing plate 34. The front catch position 52 is reached when the sliding block 70 is at the lowest point of the ramp-shaped displacement area 208 of the control path and passes into a front holding area 212 in which it is essentially horizontally guided so that the bearing lever 58 no longer executes a pivoting motion.

Approximately when the front catch position 52 is reached, further displacement of the link body 80 in the X direction initiates pivoting of the locking hook 36 from its locking into its release position by the control pin 82 of the control lever 84 leaving the holding area 206 of the control path 76 and meeting the area of an upwardly directed pivot cam 210, which cam apportions the control path 76 in the front area in the form of a recumbent Y. The control pin 82 follows the upper leg of the recumbent Y, and via the bent flange 92, impresses on the locking hook 36 a pivoting motion around the axis of the bearing pin 56 which pivotally connects the control lever 84 to the bearing lever 58. As soon as the locking hook 36 has been raised into the release position, the catch area 98 of the retaining lever 89 locks into the holding pin 87 and keeps the locking hook 36 in its release position. In doing so, actuation of the microswitch 140 is canceled via the spring arm 136 and the pin 46 of the thrust bearing 11 disengages from the locking groove 42 of the locking hook 36 so that the roof cassette 12 is decoupled from the B-column 20, and as already described in conjunction with FIGS. 1 to 6, can be lowered.

The coupling process of the roof cassette 12 by means of the closing device 14 to the thrust bearing 11 proceeds analogously in the reverse sequence, reference being made to the following particulars. If the link body 80 is in its rear end position, the control pin 82 is in front of the forward edge of the pivot cam 210. If the closing device 14 is pressed manually against the thrust bearing 11, first of all, the pin 46 strikes the second arm 94 of the retaining lever 89 from the front, i.e., the arm projecting into the receiving groove 48, by which a counterclockwise pivoting motion is impressed on the lever, and at the same time, the pin 46, upon impact with the rear wall of the locking groove 42, exerts on the locking hook 36 a force with a line of action which runs underneath the bearing pin 56 so that a counterclockwise torque is impressed on the locking hook 36. In this way, the catch area 98 of the retaining lever 89 disengages from the holding pin 87, and the locking hook 36 can pivot into its locking position without the control pin 82 hindering this motion since it is outside the control path 76. As soon as the sloped surface 95 of the retaining lever 89 adjoins the holding pin, the locking hook 36, as already described, is pretensioned by the tension spring 90 in the direction to the locking position. If the locking hook 36 has reached its locking position, the microswitch 140 is actuated as sensor 228 and delivers to the control 218 the input signal "locking hook in locking position." After a predetermined dead time has passed, for example, after 5 seconds, the control 218 triggers the automatic pulling motion of the locking hook 36 by its triggering the electric motor 222 which, for its part, actuates the displacement of the link body 80 forward in the direction toward its front end position.

When the link body 80 is moved forward (in the X direction), the control pin 82 of the control lever 84 is deflected down by the pivot cam 210 and is inserted into the lower arm of the recumbent Y. This motion is not transferred to the locking hook 36, since the projection 97 of the retaining lever 89 has not yet reached underneath the bent flange 92 of the control lever 84, but rather the bent flange can drift down from the recess 85 of the locking hook 36. Only when the locking hook 36 is pushed further in the direction to its rear catch position 54 is the retaining lever 89 swung counterclockwise to such an extent that the control lever 84 is fixed with reference to the locking hook 36 by fitting underneath the lower edge of the bent flange 92 by means of the projection 97 of the retaining lever 89. If the thrust bearing 11 and/or the side member 28 should be out of its specified position, the probe tip 124 of the probe slider 120 is not actuated or is not actuated far enough in the X direction and the link body 80 is stopped in the warning position before reaching the front end position by the stopping edge located on the bottom striking the catch projection 133 of the catch lever 130. In doing so, the electric motor 222 which actuates the compressively stiff cable 174 is blocked, and as a result, is turned off by the control 218. Conversely, if the thrust bearing 11 is in its specified position, the link body 80 can be pushed into its front end position, the locking hook 36 assuming its rear catch position. Furthermore, the driving slider 114 is exposed to a force by the electric motor 222 in the −X direction; this results in the bolt block 156 being pushed by the sloped surface 182 in the recess 180 of the driving slider 114 in the −Y direction into the recess 162 in the bearing plate 34, and at the same time, the driving slider 114 disengaging from the link body 80. The bolt block 156 is held in this position by the ball 158 which is loaded by the compression spring 160 and the automatic pulling motion of the closing device 14 is ended by the electric motor 222 being turned off.

If the operator now actuates the "close" operating position of the actuating switch 224, the electric motor 222 is activated again and pushes the driving slider 114 further forward into the transfer position where it comes to rest against the roof front edge slider 116 by means of a coupling surface 184. In doing so, via the compressively stiff cable 174, a forward force is exerted on the roof front edge slider 116, a force which is enough to push, via a sloped surface 186 on the front of the recess 172 in the guide rail section 22, the bolt block 164 of the roof front edge slider 116 in the −Z direction out of the recess 172 and into the recess 166 of the driving slider 114. In this way, the coupling between the roof front edge slider 116 and the guide rail section 22 is cancelled and coupling between the roof front edge slider 116 and the driving slider 114 is established. As alternative to the above described possibility for ending the automatic pulling motion as soon as the link body 80 is fixed with reference to the closing device 14 by means of the bolt block 156, this can also be ended only when coupling between the driving slider 114 and the roof front edge 16 has been established.

FIG. 12 shows an alternative embodiment of a closing device which differs from the one shown in FIGS. 7 to 11 essentially only in that a retaining lever corresponding to the retaining lever 89 of the first embodiment has been eliminated and the locking hook 192 does not have a rear arm corresponding to the rear arm 40 of the locking hook 36. The elastic pretensioning of the locking hook 192 in the direction toward its locking position is applied by a tension spring 196 which extends between the bent flange 194 on the locking hook 192 and the holding projection 198 on the bearing plate 34. A modified control lever 200, instead of the control pin 82 of the control lever 84, has a control tab 202 which is molded on the control lever 200 in one piece and which interacts with the control path 76 in order to control the pivoting motion of the locking hook 192. The bent flange 92 of the control lever 200, as is likewise the case for the control lever 84 of the first embodiment of the closing device, is pre-tensioned clockwise from underneath against the locking hook 192, but the pretensioning force in the second embodiment, as shown in FIG. 12, is delivered by the tension spring 90 which, in contrast to the first embodiment, extends between the bent flange 86 on the control lever 200 and the bent flange 194 on the locking hook 192.

When the link body 80 approaches its rear end position, the control tab 202, like the control pin 82 of the first embodiment, travels to in front of the forward edge of the pivot cam 210. Since the locking hook 192 is not held in its release position by a retaining lever, it now swings freely into the locking position. When the closing device as shown in FIG. 12 is coupled to the thrust bearing 11, therefore the locking hook 192 which in the locking position is in its front catch position must first be raised by the pin 46 into the release position, for which the locking hook 192 has a sloped surface 214 on its front side. There is as little blocking of the locking hook 192 in the locking position, in contrast to the first embodiment of the closing device, as the microswitch 140 for interrogating the swivel position of the locking hook 192. Instead, an inductive sensor 216 is used which is actuated by the pin 46 of the thrust bearing 11 when the pin 46 is in the position within the receiving groove 48 in which it can be locked by the locking groove of the locking hook 192 which is in the front catch position 52. Whether the locking hook 192 is in fact pivoted back into the locking position is not detected by the inductive sensor 216 which, instead of the microswitch 140, as a sensor 228 is connected to the control 218. But if this should not be the case, the pulling motion of the locking hook 192 is not transferred to the thrust bearing 11 so that it does not reach its specified position and the probe tip 124 of the thrust bearing detection device, which is accepted in principle as being unchanged in the second embodiment of the closing device, is not actuated or is not actuated far enough in the X direction. The thrust bearing detection means, in the already described manner, blocks the link body 80 when the warning position is reached, whereupon the electric motor 222 is likewise blocked. This state is detected by the control 218 which deactivates the electric motor 222. The situation "link body in the warning position" which means the same as "thrust bearing not in the specified position," is advantageously displayed to the operator so that he again decouples the closing device from the thrust bearing 11 via re-actuation of the operating position "open" of the actuating switch 224 in order to undertake a new coupling process.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Motor vehicle roof comprising a temporarily stationary roof part, an at least temporarily fixed roof part, a locking arrangement for locking and unlocking the temporarily stationary roof part to the at least temporarily fixed roof part, at least one openable roof part which is displaceable with reference to the temporarily stationary roof part and the at least temporarily fixed roof part between closed and open positions covering and exposing an opening in the roof, a drive motor for displacing of said at least one openable roof part between said closed and open positions; wherein said at least one temporarily stationary roof part supports the openable roof part in said open position; wherein the drive motor is connected to said locking arrangement for actuating at least one of locking and unlocking of the temporarily stationary roof part with reference to the at least temporarily fixed roof part.

2. Motor vehicle roof as claimed in claim 1, wherein the openable roof part is lockable in the open position in the temporarily stationary roof part.

3. Motor vehicle roof as claimed in claim 2, wherein the drive motor actuates locking of the openable roof part in the temporarily stationary roof part.

4. Motor vehicle roof as claimed in claim 1, wherein the drive motor is fixed on the temporarily stationary roof part.

5. Motor vehicle roof as claimed in claim 1, wherein the temporarily stationary roof part is a rear roof part.

6. Motor vehicle roof as claimed in claim 5, wherein the at least temporarily fixed roof part comprises rear side columns of the motor vehicle.

7. Motor vehicle roof as claimed in claim 5, wherein the rear roof part is displaceable into a lowered position after it is unlocked.

8. Motor vehicle roof as claimed in claim 5, wherein the rear roof part of the motor vehicle includes a rear window.

9. Motor vehicle roof as claimed in claim 5, wherein the rear roof part of the motor vehicle has a bottom edge which can be folded upward.

10. Motor vehicle roof as claimed in claim 9, wherein the bottom edge of the rear part is engageable against a rear door of the motor vehicle.

11. Motor vehicle roof as claimed in claim 6, where in side members extend between the rear roof part and a front cross beam which runs above a vehicle windshield on each side of the openable roof part, said side members comprising guides in which the openable roof part is at least in part movably held between its open position and its closed position.

12. Motor vehicle roof as claimed in claim 11, wherein the side members are detachably connected to the front cross beam and the rear side columns of the motor vehicle.

13. Motor vehicle roof as claimed in claim 11, wherein, when the rear roof part is locked on the at least partially temporarily stationary roof part, the guides of the side members are in alignment with guides fixed in the rear roof part for movable accommodation and support of the openable roof part in the open position.

14. Motor vehicle roof as claimed in claim 1, wherein the openable roof part is a folding roof.

* * * * *